United States Patent [19]
Felsenthal, Jr.

[11] 3,947,847
[45] Mar. 30, 1976

[54] RADAR SYSTEM

[75] Inventor: Harry D. Felsenthal, Jr., Camarillo, Calif.

[73] Assignee: The United States of America as represented by the Secretary of the Navy, Washington, D.C.

[22] Filed: Mar. 24, 1969

[21] Appl. No.: 810,037

[52] U.S. Cl. ............. 343/18 E; 343/7.4; 343/16 LS
[51] Int. Cl.² ..................... G01S 7/36; G01S 9/02
[58] Field of Search ................. 343/16.2, 7.4, 18

[56] References Cited
UNITED STATES PATENTS

| | | | |
|---|---|---|---|
| 2,464,258 | 3/1949 | Prichard | 343/18 E |
| 3,243,804 | 3/1966 | Smith, Jr. | 343/16.2 X |
| 3,268,893 | 8/1966 | Hauer | 343/16.2 UX |
| 3,277,468 | 10/1966 | Caspers | 343/7.4 |
| 3,281,837 | 10/1966 | Van Hijfte | 343/18 E |
| 3,419,868 | 12/1968 | Clayton, Jr. | 343/16.2 UX |

*Primary Examiner*—Malcolm F. Hubler
*Attorney, Agent, or Firm*—Richard S. Sciascia; Joseph M. St.Amand; Howard J. Murray, Jr.

[57] ABSTRACT

Tracking of a target by a radar possessing electronically controlled nutation (conical scan) is difficult when the target employs pulse jamming techniques, since pulsing of the jammer at or near the nutation frequency causes the radar to break lock on the target. In the present concept, the lobing reference signals for azimuth and elevation are periodically reversed in phase, the reversals of the two signals bearing a quadrature relationship to one another. By thus reversing the direction of nutation in synchronism with the radar pulse-rate switching signal, the deleterious effects of countermeasures on the radar's angle-tracking capabilities are minimized.

3 Claims, 3 Drawing Figures

RADAR SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

When a target-tracking radar, or a missile seeker assembly, incorporating electronically generated (that is, inertialess) nutation is operated in a countermeasures environment, difficulty is often experienced in maintaining lock-on. This is especially true when the target employs pulse jamming either at the nutation frequency or at a harmonic or sub-harmonic thereof. Such pulsing by the jammer in severe cases causes the radar to "break lock" on the target and in any event results in deterioration of radar performance, while a slight difference between the lobing frequency and the harmonic or sub-harmonic of the pulsing rate can cause the radar boresight to spiral around the target at this difference frequency.

An analysis of the effect of amplitude modulation on the radar return signal from a target shows that a first, or spurious, modulation may result from (1) a jammer of the barrage or repeater type, (2) from amplitude scintillation, or (3) from the amplitude component of jet engine modulation. Insofar as a pulsed jammer is concerned, practically any harmonic of the pulsing rate may contain sufficient modulation to cause difficulty. It is possible to utilize a balanced modulator to supply the radar nutation control signal and thus suppress modulation at the spurious frequency, but this expedient also suppresses the carrier. To recover the phase of the nutation (which is necessary to derive the antenna error signals) the carrier must be added to the suppressed carrier modulation; but, before re-insertion, the carrier must be limited to remove the spurious modulation. However, even with balanced modulation, spurious modulation at or near the nutation frequency is present if the spurious frequency is at or near twice the lobing frequency. Furthermore, the additional circuitry required to implement a balanced modulation network is not only costly but reduces overall system reliability.

SUMMARY OF THE INVENTION

The present concept has as its fundamental characteristic a periodic phase reversal of the reference signals applied both to the radar modulator and to the phase-sensitive detectors. This has the effect of periodically reversing the phase of any spurious modulation which may be present and reducing its amplitude to a level where it no longer adversely affects system response. These reference signal phase reversals are synchronized with a control signal, such as the pulse-rate switching signal of the radar, so that either the azimuth or elevation signal reversal coincides with the control signal switching. Reversal of the two lobing reference signals in quadrature causes the direction of nutation to be reversed at each signal reversal.

OBJECTS OF THE INVENTION

One object of the present invention, therefore, is to improve the performance of a target-tracking radar of the type described in the presence of pulse jamming.

A further object of the invention is to improve the performance of a target-tracking radar by periodically reversing the phase of the respective lobing reference signals for elevation and azimuth.

Another object of the invention is to maintain radar lock-on to a target in the face of spurious amplitude modulation in the radar return signal.

Other objects, advantages, and novel features of the invention will become apparent from the following detailed description of the invention when considered in conjunction with the accompanying drawings.

DESCRIPTION OF THE PREFERRED EMBODIMENTS

Figure 1:
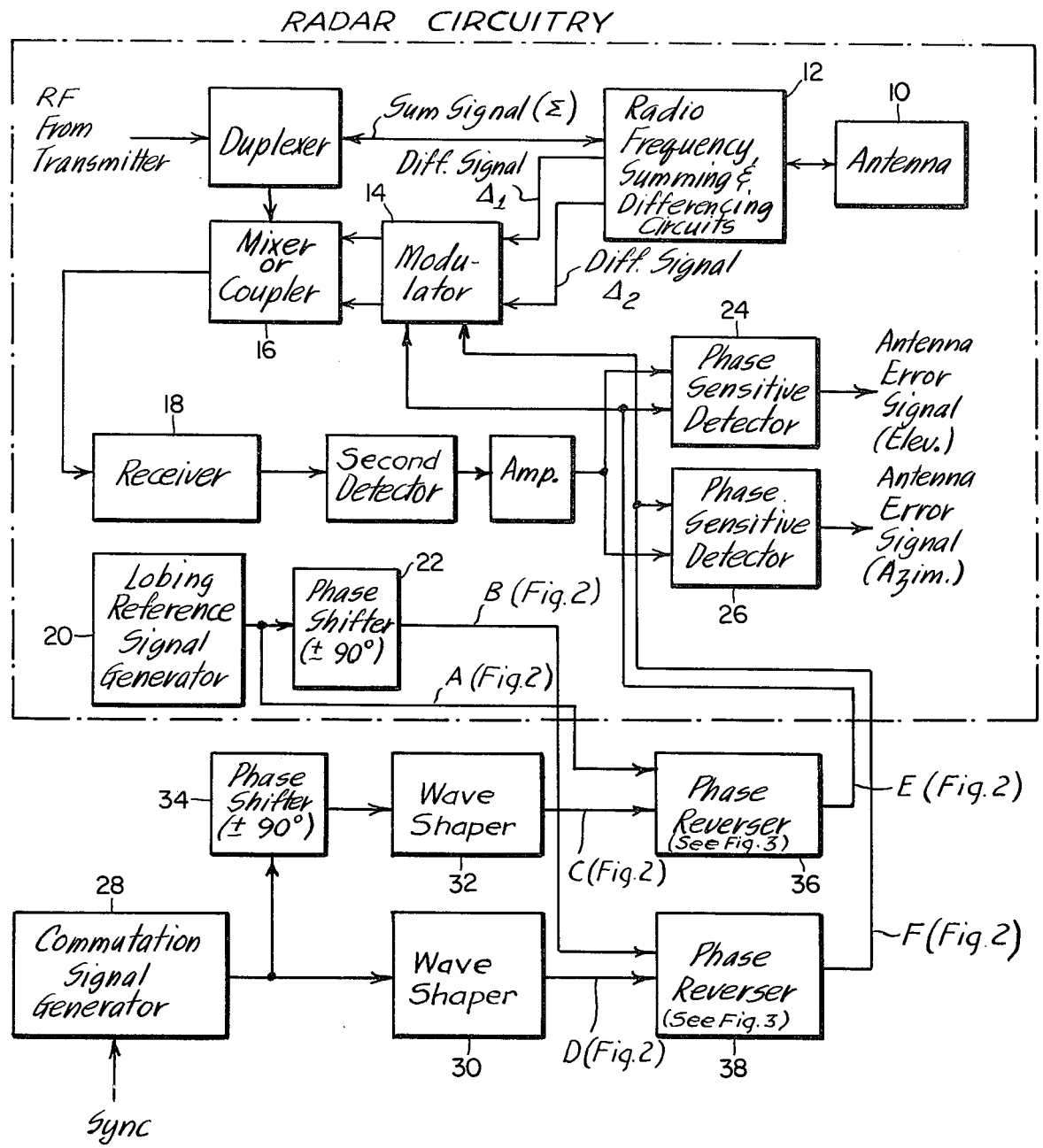
FIG. 1 is a block diagram of a preferred form of the present invention as applied to a radar system possessing electronically controlled nutation for tracking a target.

In order to fully understand the principles underlying the present concept, it will be helpful to consider a carrier signal $e = E \sin(\omega t)$, which is amplitude-modulated by two separate sinusoidal modulating signals. The first modulating signal is $M \sin(\theta t + \alpha)$, where:

$\theta$ is modulating angular frequency $\alpha$ is the phase of the modulating signal $M$ is the fractional modulation (% mod. ÷ 100)

This signal, already modulated as above, is amplitude-modulated by the second modulating signal, $N \sin(\phi t + \beta)$, where:

$\phi$ is the modulating angular frequency $\beta$ is the phase of the modulating signal $N$ is the fractional modulation The first modulation, which is not desired, is referred to below as "spurious." The second, or applied, modulation is the wanted one. The objective is to minimize the spurious moduoation.

Applying the first (spurious) amplitude modulation:

$$e_o/E = [1 + M \sin(\theta t + \alpha)] \sin(\omega t) \qquad (1)$$

Expanding this:

$$\frac{e_0}{E} = \sin(\omega t) + \frac{M}{2} \cos[(\omega - \theta)t - \alpha] - \frac{M}{2} \cos[(\omega + \theta)t + \alpha] \qquad (2)$$

Applying the second, or "applied" amplitude modulation to equation (2):

$$\frac{e_1}{E} = \left\{ 1 + N \sin(\phi t + \beta) \right\} \left\{ \sin(\omega t) + \frac{M}{2} \cos[(\omega - \theta)t - \alpha] - \frac{M}{2} \cos[(\omega + \theta)t + \alpha] \right\} \qquad (3)$$

Expanding this:

$$\frac{e_1}{E} = \underbrace{\sin(\omega t)}_{\text{carrier}} + \underbrace{\frac{M}{2}\{\cos[(\omega-\theta)t-\alpha] - \cos[(\omega+\theta)t+\alpha]\}}_{\text{spurious sidebands}}$$

$$+ \underbrace{\frac{N}{2}\{\cos[(\omega-\phi)t-\beta] - \cos[(\omega+\phi)t+\beta]\}}_{\text{applied modulation sidebands}}$$

$$+ \underbrace{\frac{MN}{4}\left\{\cos\left[(\omega-\theta+\phi)t - (\alpha-\beta+\frac{\pi}{2})\right] - \cos\left[(\omega+\theta-\phi)t + (\alpha-\beta+\frac{\pi}{2})\right]\right\}}_{\text{difference frequency sidebands}}$$

$$+ \underbrace{\frac{MN}{4}\left\{\cos\left[(\omega-\theta-\phi)t - (\alpha+\beta-\frac{\pi}{2})\right] - \cos\left[(\omega+\theta+\phi)t + (\alpha+\beta-\frac{\pi}{2})\right]\right\}}_{\text{sum frequency sidebands}} \quad (4)$$

Amplitude modulation sidebands of both modulation frequencies, and of their sum and difference frequencies, are present.

If the two modulation frequencies are equal, such that ($\theta = \phi$):

$$\frac{e_1}{E} = \underbrace{\left\{1 + \frac{MN}{2}\cos(\alpha-\beta)\right\}\sin(\omega t)}_{\text{carrier}} + \underbrace{\frac{M}{2}\{\cos[(\omega-\phi)t-\alpha] - \cos[(\omega+\phi)t+\alpha]\}}_{\substack{\text{spurious sidebands at} \\ \text{applied modulation frequency}}}$$

$$+ \underbrace{\frac{N}{2}\{\cos[(\omega-\phi)t-\beta] - \cos[(\omega+\phi)t+\beta]\}}_{\text{applied modulation sidebands}}$$

$$+ \underbrace{\frac{MN}{4}\left\{\cos\left[(\omega-2\phi)t - (\alpha+\beta-\frac{\pi}{2})\right] - \cos\left[(\omega+2\phi)t + (\alpha+\beta-\frac{\pi}{2})\right]\right\}}_{\text{second harmonic sidebands}} \quad (5)$$

It will be observed that the sidebands of the applied modulation frequency have a considerable spurious component, with a phase unrelated to that of the applied modulation.

If $\theta = 2\phi$:

$$\frac{e_1}{E} = \underbrace{\sin(\omega t)}_{\text{carrier}} + \underbrace{\frac{N}{2}\{\cos[(\omega-\phi)t-\beta] - \cos[(\omega+\phi)t+\beta]\}}_{\text{applied modulation sidebands}}$$

$$+ \underbrace{\frac{MN}{4}\left\{\cos\left[(\omega-\phi)t - (\alpha-\beta+\frac{\pi}{2})\right] - \cos\left[(\omega+\phi)t + (\alpha-\beta+\frac{\pi}{2})\right]\right\}}_{\substack{\text{spurious sidebands at applied} \\ \text{modulation frequency}}}$$

$$+ \underbrace{\frac{M}{2}\{\cos[(\omega-2\phi)t-\alpha] - \cos[(\omega+2\phi)t+\alpha]\}}_{\text{second harmonic sidebands}}$$

$$+ \underbrace{\frac{MN}{4}\left\{\cos\left[(\omega-3\phi)t - (\alpha+\beta-\frac{\pi}{2})\right] - \cos\left[(\omega+3\phi)t + (\alpha+\beta-\frac{\pi}{2})\right]\right\}}_{\text{third harmonic sidebands}} \quad (6)$$

There is spurious modulation at the applied modulation frequency.

If the signal $e_o$ (with spurious modulation only) is modulated by a phase-reversed applied modulation signal, and the resultant signal $e_2$ is subtracted from $e_1$, the result is equivalent to the output of a balanced modulator:

$$\frac{e_2}{E} = \{1 - N\sin(\phi t+\beta)\}\left\{\sin(\omega t) + \frac{M}{2}\cos[(\omega-\theta)t-\alpha] - \frac{M}{2}\cos[(\omega+\theta)t+\alpha]\right\} \quad (7)$$

Subtracting equation (7) from equation (3) (and dividing by 2, to keep the relative signal level equal to that of equation (3)):

$$\frac{e_1-e_2}{2E} = N\sin(\phi t+\beta)\left\{\sin(\omega t) + \frac{M}{2}\cos[(\omega-\theta)t-\alpha] - \frac{G1M}{2}\cos[(\omega+\theta)t+\alpha]\right\} \quad (8)$$

Expanding this:

$$\frac{e_1-e_2}{2E} = \underbrace{\frac{N}{2}\{\cos[(\omega-\phi)t-\beta] - \cos[(\omega+\phi)t+\beta]\}}_{\text{applied modulation sidebands}}$$

$$+ \frac{MN}{4}\left\{\cos\left[(\omega-\theta+\phi)t-(\alpha-\beta+\frac{\pi}{2})\right] - \cos\left[(\omega+\theta-\phi)t+(\alpha-\beta+\frac{\pi}{2})\right]\right\}$$
$$\longleftarrow \text{difference frequency sidebands} \longrightarrow$$

$$+ \frac{MN}{4}\left\{\cos\left[(\omega-\theta-\phi)t-(\alpha+\beta-\frac{\pi}{2})\right] - \cos\left[(\omega+\theta+\phi)t+(\alpha+\beta-\frac{\pi}{2})\right]\right\} \quad (9)$$
$$\longleftarrow \text{sum frequency sidebands} \longrightarrow$$

The carrier and the spurious sidebands have been suppressed, but sidebands at the sum and difference of the two modulation frequencies are present.

If $\theta = \phi$:

$$\frac{e_1-e_2}{2E} = \frac{MN}{2}\left\{\cos(\alpha-\beta)\sin(\omega t) + \frac{N}{2}\cos[(\omega-\phi)t-\beta]-\cos[(\omega+\phi)t+\beta]\right\}$$
$$\longleftarrow \text{carrier} \longrightarrow \quad \longleftarrow \text{spurious sidebands} \longrightarrow$$

$$+ \frac{MN}{4}\left\{\cos\left[(\omega-2\phi)t-(\alpha+\beta-\frac{\pi}{2})\right] - \cos\left[(\omega+2\phi)t+\alpha+\beta-(\frac{\pi}{2})\right]\right\} \quad (10)$$
$$\longleftarrow \text{second harmonic sidebands} \longrightarrow$$

A component of carrier frequency, in phase with the original carrier, has been added (assuming that the two frequencies are exactly equal). There is no spurious modulation at the applied modulation frequency.

However, if $\theta = 2\phi$:

$$\frac{e_1-e_2}{2E} = \frac{N}{2}\left\{\cos[(\omega-\phi)t-\beta] - \cos[(\omega+\phi)t+\beta]\right\}$$
$$\longleftarrow \text{applied modulation sidebands} \longrightarrow$$

$$+ \frac{MN}{4}\left\{\cos\left[(\omega-\phi)t-(\alpha-\beta+\frac{\pi}{2})\right]\left[-\cos\ (\omega+\phi)t+(\alpha-\beta+\frac{\pi}{2})\right]\right\}$$
$$\longleftarrow \text{spurious sidebands at applied modulation frequency} \longrightarrow$$

$$+ \frac{MN}{4}\left\{\cos\left[(\omega-3\phi)t-(\alpha+\beta-\frac{\pi}{2})\right] - \cos\left[(\omega+3\phi)t+(\alpha+\beta-\frac{\pi}{2})\right]\right\} \quad (11)$$
$$\longleftarrow \text{third harmonic sidebands} \longrightarrow$$

Spurious modulation at the applied modulation frequency, of the same magnitude as that which is present with unbalanced modulation (equation (6)) is present; therefore, the case where $\theta = 2\phi$ appears to be unsuitable for suppression of spurious modulation.

From the above analysis, it will be seen that, although use of a balanced modulator to apply the nutation modulation suppresses modulation at the spurious frequency, it also suppresses the carrier (equation 9). To recover the phase of the nutation, the carrier must be re-inserted after limiting to remove the spurious modulation.

Shown within the broken lines in FIG. 1 of the drawings, is a radar system of the nature discussed above. It is identified as the AN/AWG-9, and includes an electronically-nutated antenna 10 from which azimuth and elevation difference signals $\Delta_1$ and $\Delta_2$ are developed in a circuit 12 for application to a modulator 14 of the ferrite type. The output of modulator 14 is a suppressed-carrier signal, amplitude-modulated at the nutation frequency. The amplitude and phase of this modulation are proportional to the magnitude and direction, respectively, of the antenna boresight error. The carrier (sum signal) is re-inserted in a variable coupler 16 which feeds into the receiver 18.

IF a spurious modulation is present in the received signal, this gets into the output of the variable coupler 16 both through unbalance of the ferrite modulator output as well as through modulation of the sum signal. Generation of a balanced output (equation 9, above) would require a duplicate balanced modulator, modulated by phase-reversed reference signals. Also, a limited carrier (sum signal) would have to be derived for re-insertion in the variable coupler 16.

Figure 2:
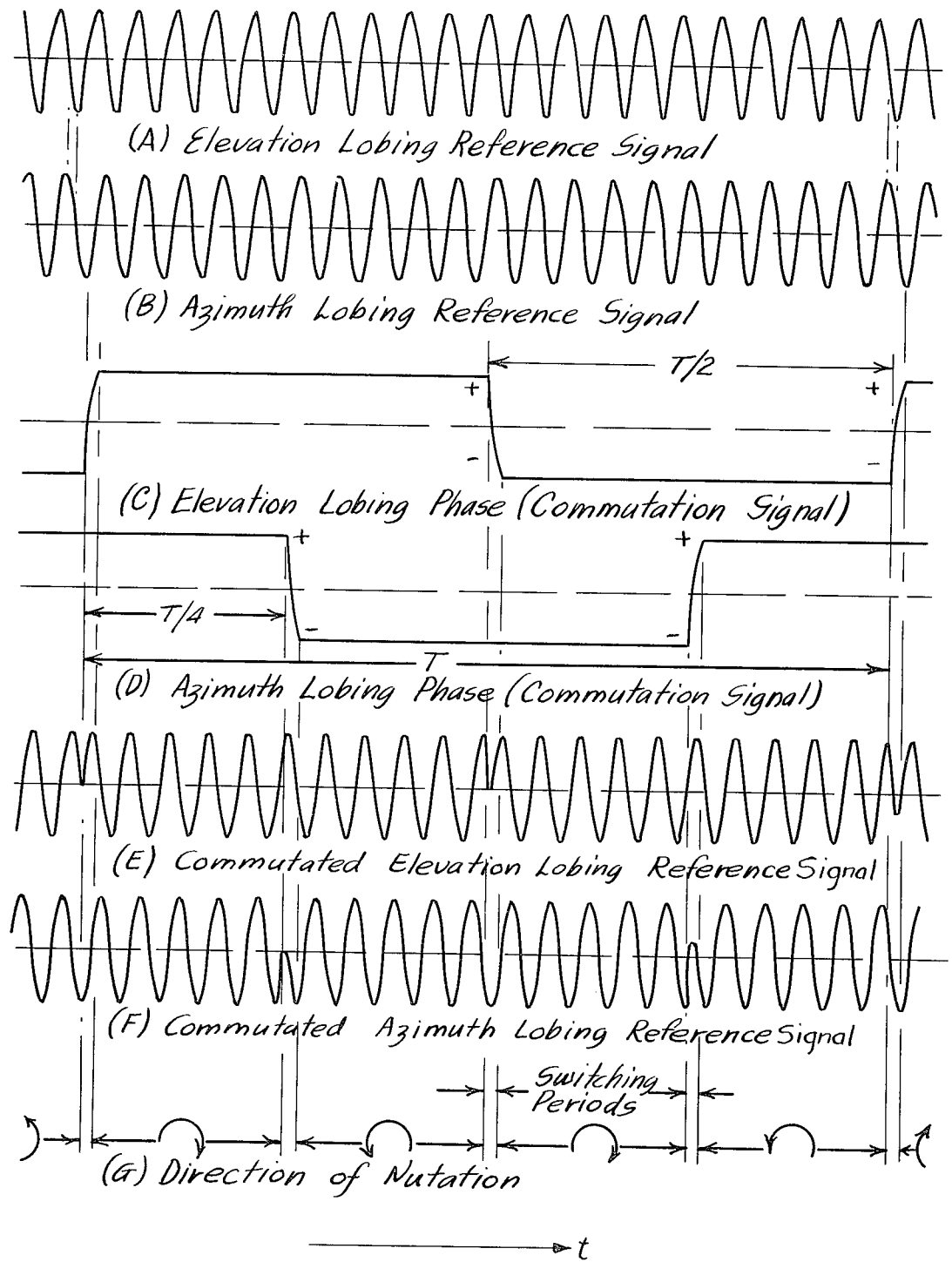
FIG. 2 is a set of waveforms useful in explaining the operation of the system of FIG. 1.

A lobing signal reference generator 20 produces two output waves, (1) an elevation lobing reference signal, shown as (A) in FIG. 2. and (2) an azimuth lobing reference signal shown as (B) in FIG. 2, representing the output of the 90°phase shifter 22. These waves (A) and (B) are normally both applied to the modulator 14, while wave (A) is additionally applied to the phase-sensitive detector 24 and wave (B) to the phase-sensitive detector 26 to yield the respective antenna error signals.

In accordance with a preferred embodiment of the present invention, the phase of these reference signals (A) and (B) is periodically reversed, thereby reversing the phase of any spurious modulation which may be present in the radar return signal and minimizing its effect. This is accomplished by reversing the phase of the azimuth and elevation signals in quadrature. In one complete cycle of phase reversal (period T in FIG. 2) the elevation and azimuth reference signals (A) and (B) are each reversed twice, such action being brought about by means illustrated in the lower portion of FIG. 1 of the drawings, whicn means will now be described.

A commutation signal generator 28 develops a sine wave output synchronized with some phase of radar operation, such as pulse-rate switching. A portion of this output is applied through a wave shaper 30 to result in a rectangular wave designated as (D) in FIG. 2 and representing the azimuth lobing phase. Another portion of the output of generator 28 is fed to a second wave shaper 32 through a 90° phase shifter 34 to result in the rectangular wave (C) of FIG. 2 representing the elevation lobing phase. Both the elevation lobing reference signal (A) from generator 20 and the commutation signal wave (C) from wave shaper 32 are applied to a phase reverser 36, while the azimuth lobing reference signal wave (B) from phase shifter 22 and the commutation signal wave (D) from wave shaper 30 are applied to a second phase reverser 38.

Figure 3:
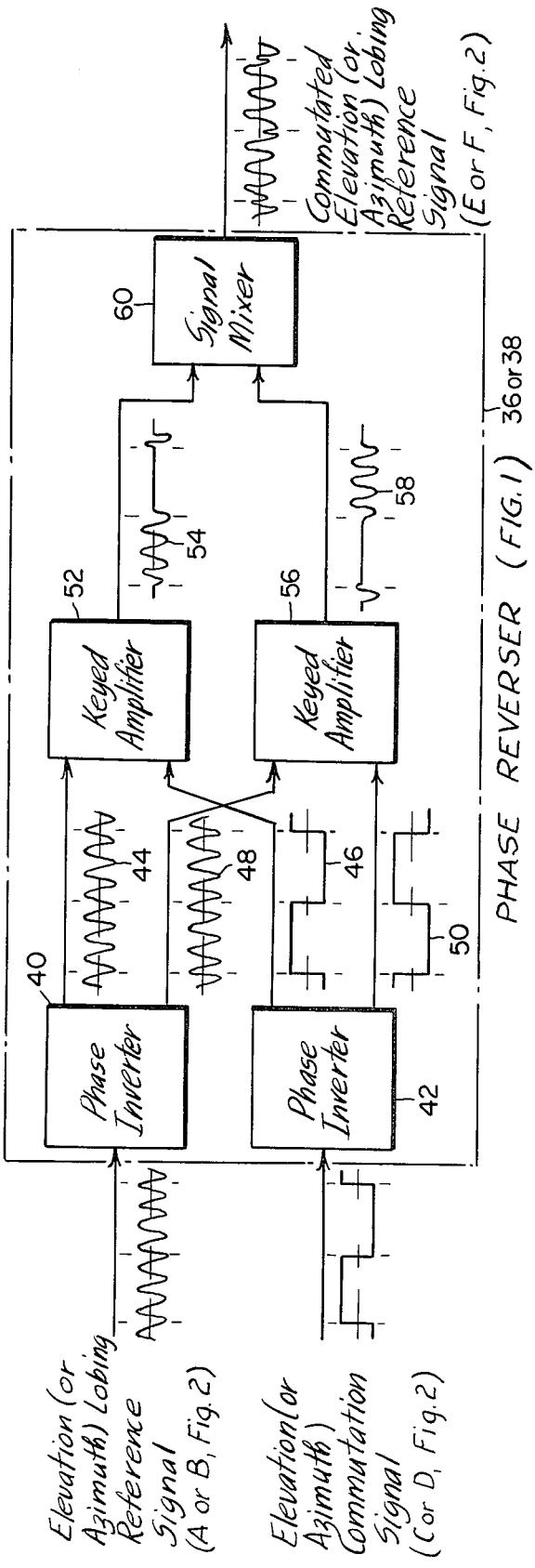
FIG. 3 is a block diagram showing details of one of the components making up the system of FIG. 1.

The details of the phase reversers 36 and 38 are shown in FIG. 3. These two units may be identical in design, and each includes a pair of phase inverters 40 and 42 acting to develop two output waves one of which (44, 46) is similar to the input wave and the other of which (48, 50) is of inverted phase. The wave 46 is applied to a keyed amplifier 52 which acts to periodically gate the wave 44 therethrough to yield an output wave 54, as illustrated in FIG. 3. Similarly, the keyed amplifier 56 receives the wave 50, and acts to gate the wave 48 therethrough to yield an output wave 58. The two waves 54 and 58 are combined in a mixer 60, the output of which is either the wave (E) or (F) in FIG. 2, representing either the commutated elevation lobing reference signal or the commutated azimuth lobing reference signal. Referring back to FIG. 1, it will be seen that the former, from unit 36, is applied both to the modulator 14 and to the phase-sensitive detector 24. The latter, from unit 38, is applied both to the modulator 14 and to the phase-sensitive detector 26. From FIG. 2 it will be noted that the elevation lobing reference signal (A) is periodically reversed in phase by wave (C) to yield a commutated elevation lobing reference signal (E), while the azimuth lobing reference signal (B) is periodically reversed in phase by wave (D) to yield a commutated azimuth reference signal (F).

Because of the spiralling motion of the antenna 10 when the spurious frequency differs slightly from the nutation frequency, it also appears desirable to periodically reverse the direction of nutation as shown by wave (G) in FIG. 2, where this reversal is indicated as occuring four times within period T.

Certain radar systems (such as the AN/AWG-9 mentioned above) avoid the problem of "eclipsing" or "blind ranges" when in the single target track mode by switching the PRF between two values at a rate of 6 Hz, dwelling for 83.33 milliseconds at each value. When the present invention is used in such an environment, the commutation of nutation phase (curve (G), FIG. 2) should be synchronized with the PRF switching, one of the phase reversals occuring at the time the PRF is switched. If one complete nutation cycle of period T occurs during one PRF period, the direction of nutation is reversed each 20.83 milliseconds. Since the nutation frequency might lie in the range between 205 and 600 Hz, there will be 12.50 nutation cycles in one nutation period of T/4 at 600 Hz, while there will be 4.25 nutation cycles at 205 Hz. Obviously there should be a sufficient number of nutation cycles per nutation period to generate the servo error signals.

As an alternative to the above, the period T can be increased so that one complete PRF switching cycle of 166.67 milliseconds occupies each nutation period of T/4. At the lowest nutation frequency there will be 34 nutation cycles in the period T/4, or 17 cycles at each PRF. The complete period T is 0.667 sec., which is comparable to the antenna response time of approximately 0.5 sec.

I claim:

1. In a radar of the type possessing an electronically nutated antenna from the output of which azimuth and elevation difference signals are obtained and applied to a modulator for development of a suppressed-carrier wave which is amplitude-modulated at the nutation frequency and which has an amplitude and phase proportional to the amplitude and direction of antenna boresight error, and in which a lobing reference signal generator develops an elevation lobing reference signal and an azimuth lobing reference signal for application to said modulator and also for respective application to two phase-sensitive detectors in order to generate a pair of antenna error signals, the improvement which comprises apparatus for improving the target-tracking capabilities of said radar in a pulse-jamming environment, where said pulse jamming is at or near the antenna nutation frequency, said apparatus including means for periodically reversing the phase of the said two lobing reference signals so as to minimize the effect of any jamming energy which may be present in the return signal from the target, wherein said means for periodically reversing the phase of the said two lobing reference signals including means for developing a pair of rectangular commutating waves 90° out of phase with one another, a pair of phase reversers, means for applying to the other of said phase reversers said azimuth lobing reference signal and the other of said commutating waves, means for applying the output of said one phase reverser both to said modulator and to one of said phase-sensitive detectors, and means for applying the output of the other of said phase reversers both to said modulator and to the remaining one of said phase-sensitive detectors.

2. A radar as set forth in claim 1, in which each of said phase reversers includes a pair of amplifiers keyed by one of said commutating waves so as to control the passage therethrough of one of said lobing reference signals.

3. The combination of claim 2, in which each of said phase reversers includes means for combining the signals constituting the respective outputs of said pair of amplifiers.

* * * * *